US012597954B2

(12) United States Patent
Iezzi

(10) Patent No.: US 12,597,954 B2
(45) Date of Patent: Apr. 7, 2026

(54) SYSTEM AND METHOD OF NOISE REDUCTION

(71) Applicant: Aeronix, Inc., Melbourne, FL (US)

(72) Inventor: Steven L. Iezzi, Melbourne, FL (US)

(73) Assignee: Aeronix, Inc., Melbourne, FL (US)

( * ) Notice: Subject to any disclaimer, the term of this patent is extended or adjusted under 35 U.S.C. 154(b) by 51 days.

(21) Appl. No.: 18/644,411

(22) Filed: Apr. 24, 2024

(65) Prior Publication Data

US 2024/0283476 A1     Aug. 22, 2024

Related U.S. Application Data

(63) Continuation of application No. 17/813,459, filed on Jul. 19, 2022, now Pat. No. 11,888,506.

(60) Provisional application No. 63/262,697, filed on Oct. 19, 2021.

(51) Int. Cl.
*H04B 1/10* (2006.01)
(52) U.S. Cl.
CPC ......... *H04B 1/1081* (2013.01); *H04B 1/1027* (2013.01)
(58) Field of Classification Search
CPC .......................... H04B 1/1081; H04B 1/1027
See application file for complete search history.

(56) References Cited

U.S. PATENT DOCUMENTS

| | | | |
|---|---|---|---|
| 8,644,410 B2 | 2/2014 | Suzuki et al. | |
| 9,735,799 B1 * | 8/2017 | Nguyen ................. | H03M 1/06 |
| 10,411,744 B1 | 9/2019 | Wilson et al. | |
| 11,031,028 B2 | 6/2021 | Osako et al. | |
| 2006/0217977 A1 * | 9/2006 | Gaeta .................. | G10L 21/0208 |
| | | | 704/205 |
| 2008/0010040 A1 * | 1/2008 | McGehee ........... | G06F 18/2134 |
| | | | 702/189 |
| 2013/0083876 A1 * | 4/2013 | Suzuki ................. | H04B 1/1027 |
| | | | 375/350 |
| 2023/0198547 A1 * | 6/2023 | Mazzaro ............. | H03M 7/3008 |

OTHER PUBLICATIONS

USPTO Office action in related U.S. Appl. No. 17/813,459 issued May 8, 2023; 13 pages.

* cited by examiner

*Primary Examiner* — Janice N Tieu
(74) *Attorney, Agent, or Firm* — Kelly G. Swartz; Widerman Malek, PL

(57) ABSTRACT

A method for assessing a noise reduction algorithm and subsequent training of a neural network including the steps of: (1) providing a spectrogram containing noise and at least one signal of interest to the neural network; (2) analyzing the spectrogram to create a transfer function for a noise reduction algorithm; (3) applying the noise reduction algorithm to the spectrogram to produce a noise reduced spectrogram; (4) identifying a signal of interest within the noise reduced spectrogram; (5) calculating an assessment criterion for the noise reduced spectrogram or the signal of interest; and (6) iteratively creating an updated transfer function based on a value of the assessment criteria.

20 Claims, 7 Drawing Sheets

100

110
Provide a spectrogram containing noise and at least one signal of interest to the neural network.

120
Analyze the spectrogram to create a transfer function for a noise reduction algorithm.

130
Apply the noise reduction algorithm to the spectrogram to produce a noise reduced spectrogram.

140
Identify a signal of interest within the noise reduced spectrogram.

150
Calculate an assessment criterion for the noise reduced spectrogram or the signal of interest.

160
Iteratively create an updated transfer function based on a value of the assessment criteria.

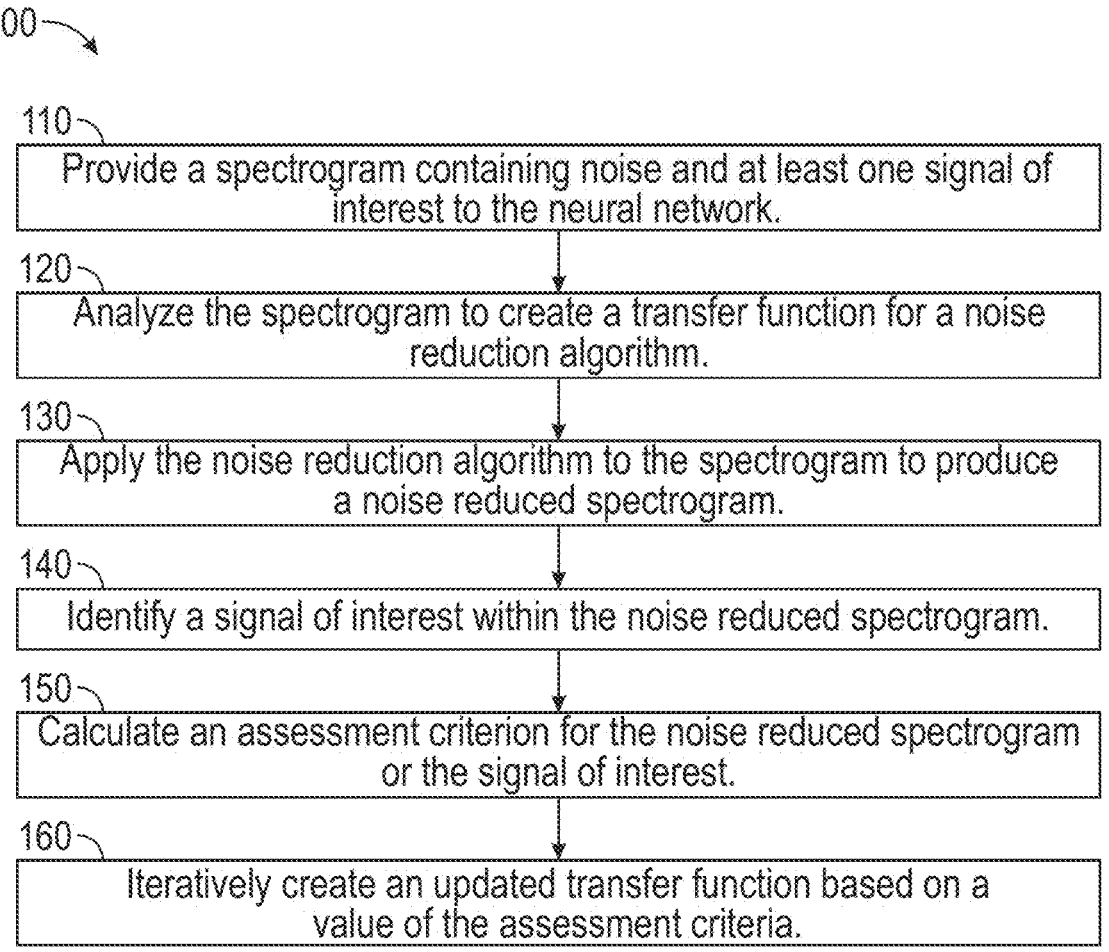

100

110
Provide a spectrogram containing noise and at least one signal of interest to the neural network.

120
Analyze the spectrogram to create a transfer function for a noise reduction algorithm.

130
Apply the noise reduction algorithm to the spectrogram to produce a noise reduced spectrogram.

140
Identify a signal of interest within the noise reduced spectrogram.

150
Calculate an assessment criterion for the noise reduced spectrogram or the signal of interest.

160
Iteratively create an updated transfer function based on a value of the assessment criteria.

FIG. 1

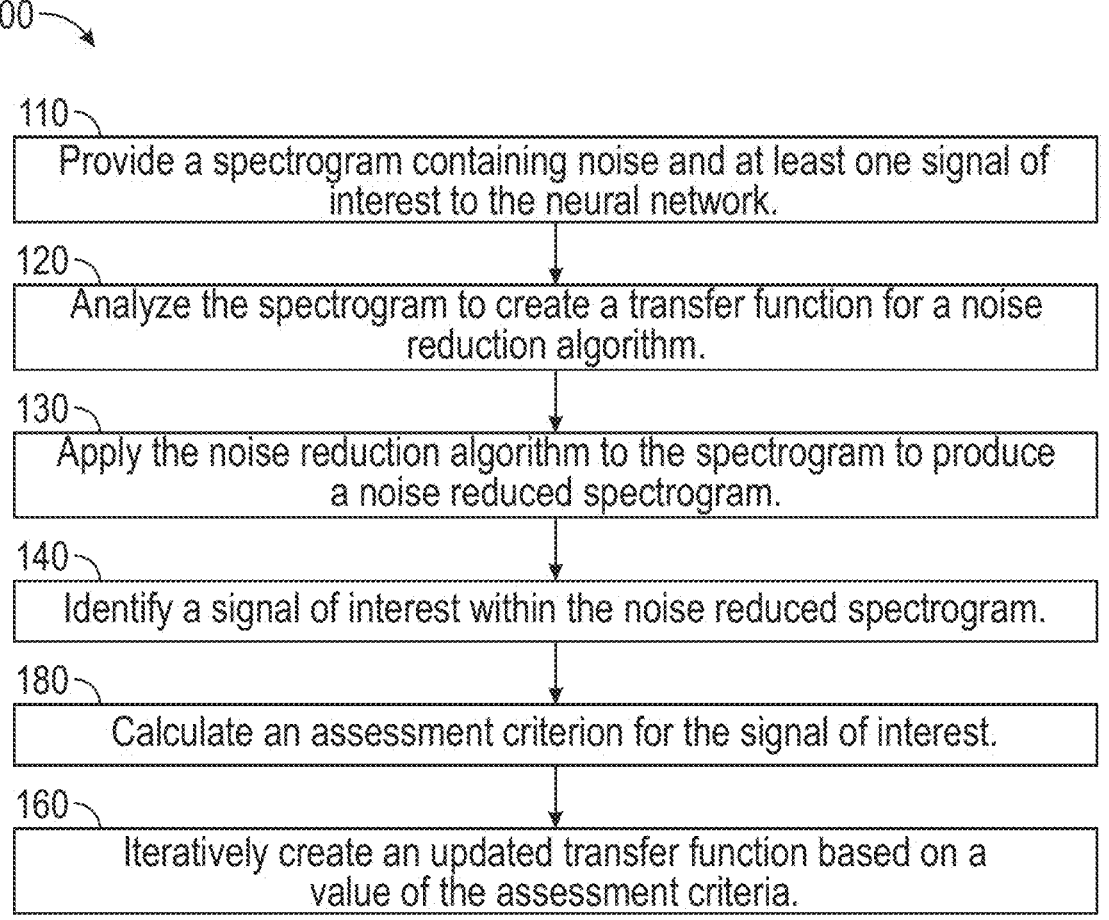

100

110
Provide a spectrogram containing noise and at least one signal of interest to the neural network.

120
Analyze the spectrogram to create a transfer function for a noise reduction algorithm.

130
Apply the noise reduction algorithm to the spectrogram to produce a noise reduced spectrogram.

140
Identify a signal of interest within the noise reduced spectrogram.

180
Calculate an assessment criterion for the signal of interest.

160
Iteratively create an updated transfer function based on a value of the assessment criteria.

FIG. 3

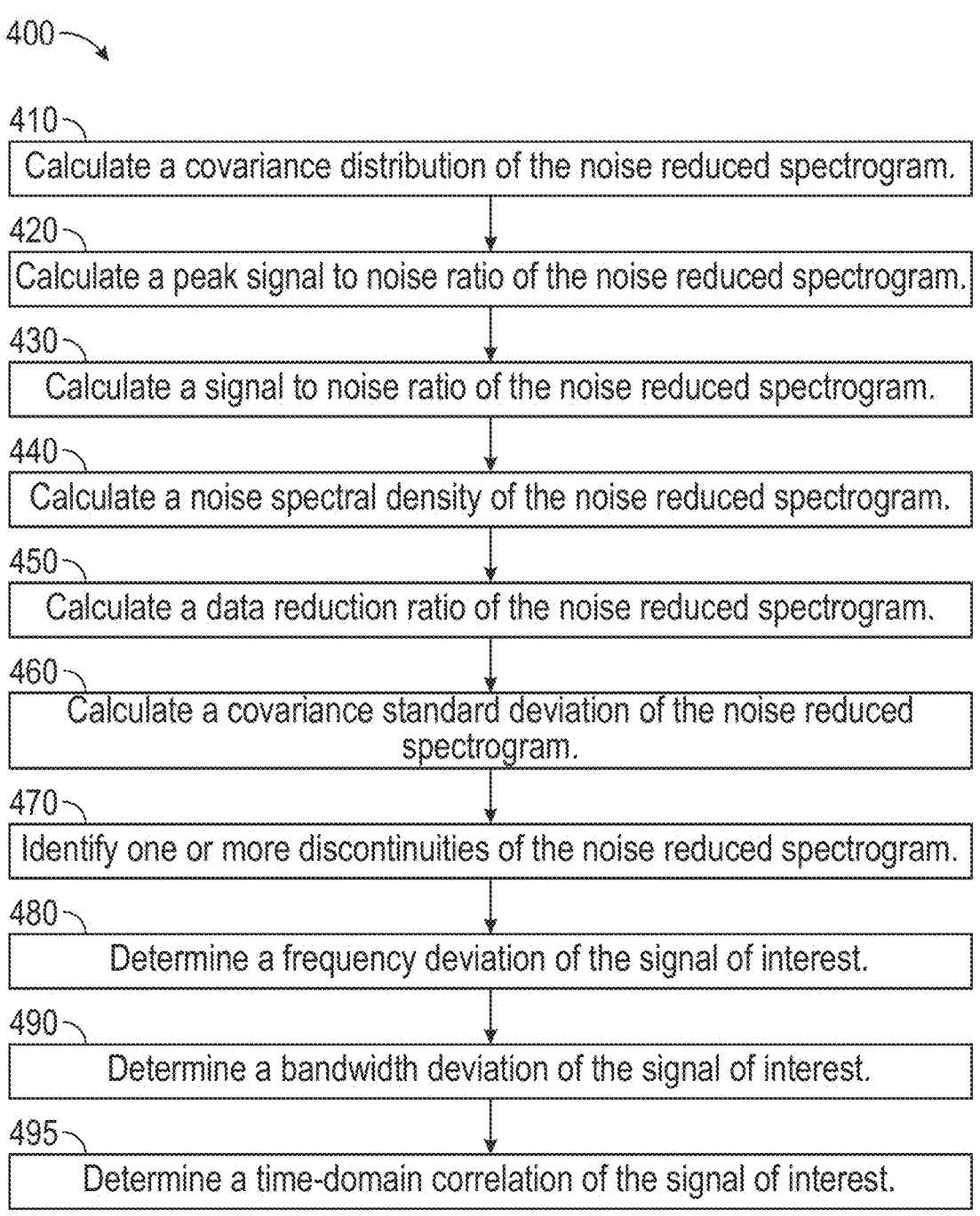

400

410
Calculate a covariance distribution of the noise reduced spectrogram.

420
Calculate a peak signal to noise ratio of the noise reduced spectrogram.

430
Calculate a signal to noise ratio of the noise reduced spectrogram.

440
Calculate a noise spectral density of the noise reduced spectrogram.

450
Calculate a data reduction ratio of the noise reduced spectrogram.

460
Calculate a covariance standard deviation of the noise reduced spectrogram.

470
Identify one or more discontinuities of the noise reduced spectrogram.

480
Determine a frequency deviation of the signal of interest.

490
Determine a bandwidth deviation of the signal of interest.

495
Determine a time-domain correlation of the signal of interest.

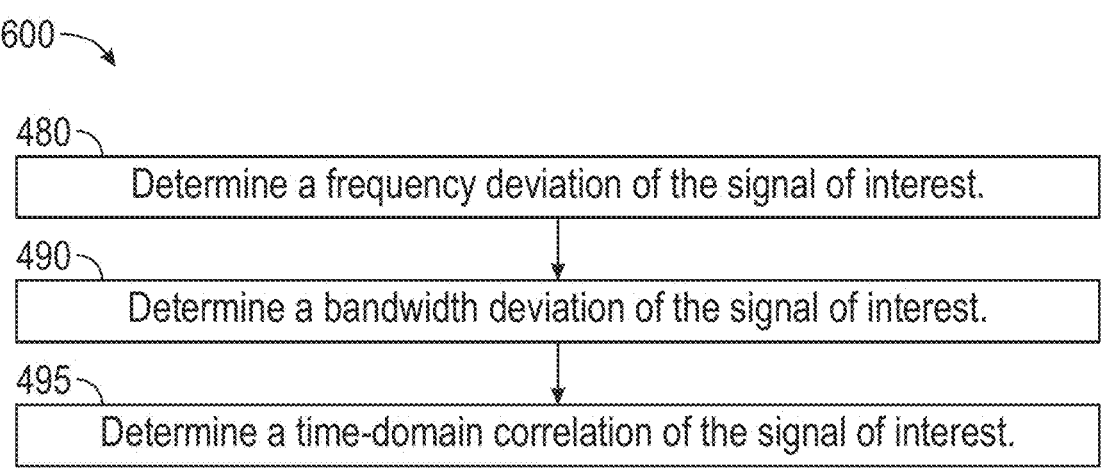

480    Determine a frequency deviation of the signal of interest.

490    Determine a bandwidth deviation of the signal of interest.

495    Determine a time-domain correlation of the signal of interest.

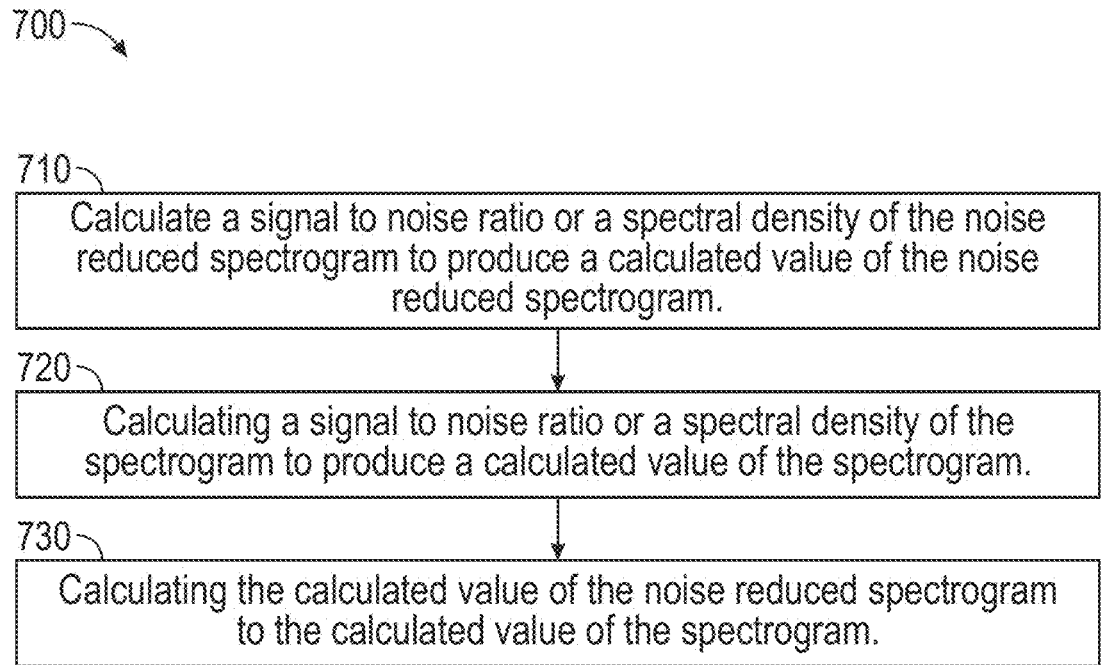

710    Calculate a signal to noise ratio or a spectral density of the noise reduced spectrogram to produce a calculated value of the noise reduced spectrogram.

720    Calculating a signal to noise ratio or a spectral density of the spectrogram to produce a calculated value of the spectrogram.

730    Calculating the calculated value of the noise reduced spectrogram to the calculated value of the spectrogram.

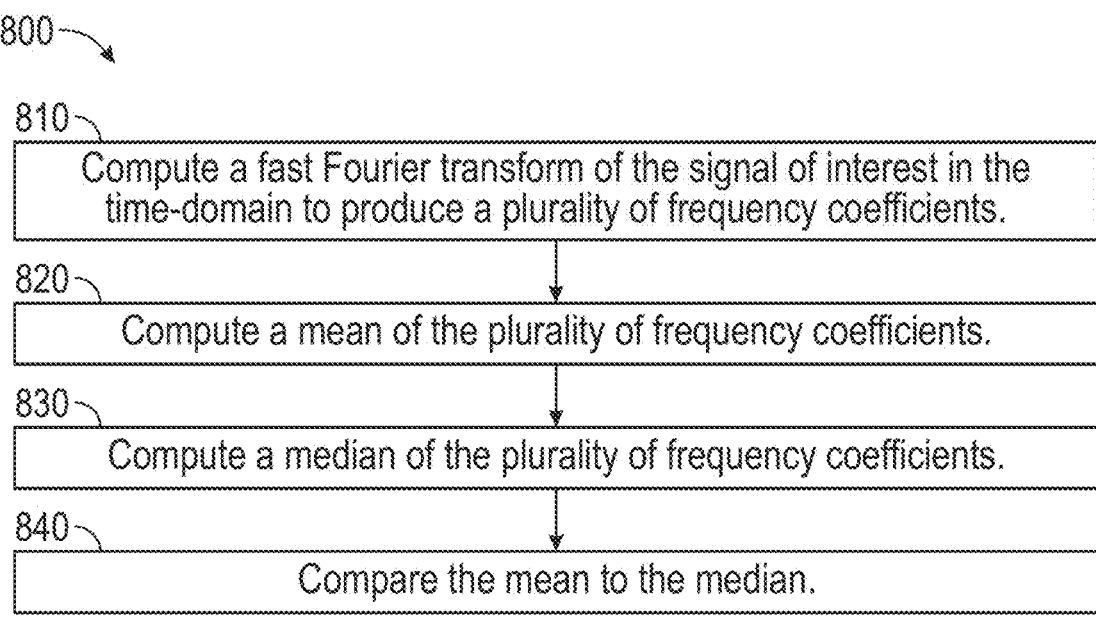

810
Compute a fast Fourier transform of the signal of interest in the time-domain to produce a plurality of frequency coefficients.

820
Compute a mean of the plurality of frequency coefficients.

830
Compute a median of the plurality of frequency coefficients.

840
Compare the mean to the median.

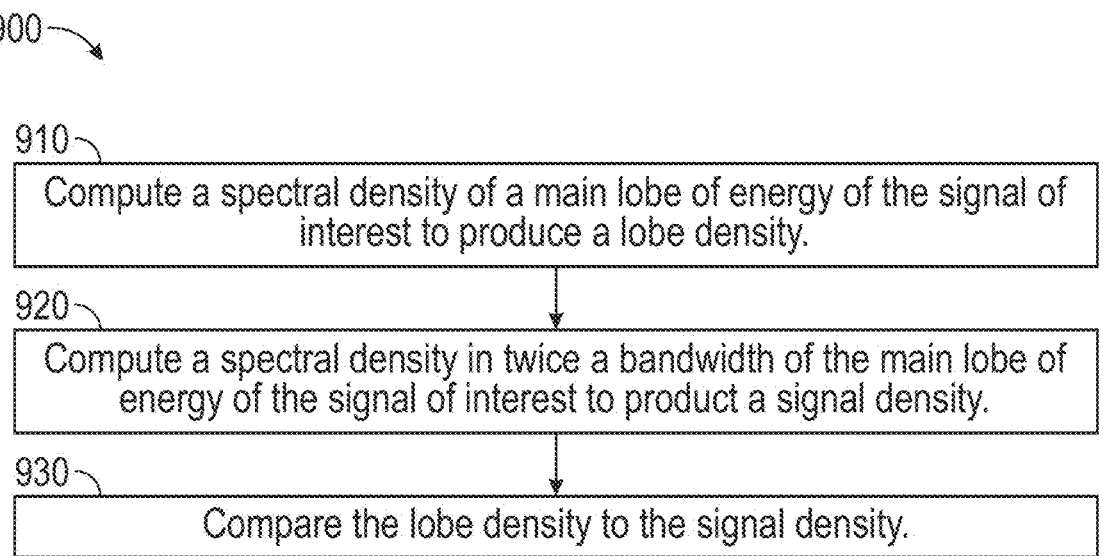

910
Compute a spectral density of a main lobe of energy of the signal of interest to produce a lobe density.

920
Compute a spectral density in twice a bandwidth of the main lobe of energy of the signal of interest to product a signal density.

930
Compare the lobe density to the signal density.

FIG. 9

SYSTEM AND METHOD OF NOISE REDUCTION

RELATED APPLICATIONS

This application is a continuation application of and claims priority under 35 U.S.C. § 120 of U.S. Patent Application Publication No. 2024/0056113 filed on Oct. 23, 2023 and titled SYSTEM AND METHOD OF NOISE REDUCTION, which is a continuation of U.S. patent application Ser. No. 17/813,459 filed on Jul. 19, 2022 and titled SYSTEM AND METHOD OF NOISE REDUCTION, which claims priority under 35 U.S.C. § 119(e) of U.S. Provisional Patent Application Ser. No. 63/262,697 filed on Oct. 19, 2021 and titled DIGITAL HIGH PROBABILITY OF INTERCEPT RECEIVER. The content of these applications is incorporated herein by reference.

FIELD OF THE INVENTION

The present invention relates to systems and methods for noise reduction in signal processing. More specifically, the present invention relates to a method and system for reducing noise which allows for the identification of signals of interest discovered by high probability of intercept receivers.

BACKGROUND OF THE INVENTION

Known systems may utilize a wideband High Probability of Intercept (HPOI) receiver to detect potential signals of interest in real-time. The known HPOI receiver may stare at the entire spectrum of interest and identify any signals that rise above a derived threshold based on the measured noise floor. Signals that satisfy the threshold are further analyzed to identify their characteristics.

The limiting factor for this known architecture is the noise level of the HPOI receiver. Because of the high noise bandwidth, the noise floor dominates the sampled data such that only the strongest signals rise above the threshold.

Current implementations of HPOI technology utilize a single channel wide bandwidth receiver with a log detector looking for signals that generate a recognizable peak above the noise floor. Broadband receivers frequently mask the appearance of signals of interest that are residing below the noise floor.

Noise reduction is required to detect signals of interest from advanced emitters designed to obfuscate their presence. However, aggressive data reduction algorithms that operate at the highest performance levels also cause signal degradation that may interfere with the identification and classification processes.

Therefore, a need exists for a system that will be able to identify signals that reside within the noise.

Similarly, a need exists for a system that will evaluate or optimize noise reduction algorithms.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method for assessing the noise reduction algorithms and subsequent training of a neural network including the steps of (1) providing a spectrogram containing noise and at least one signal of interest to the neural network; (2) analyzing the spectrogram to create a transfer function for a noise reduction algorithm; (3) applying the noise reduction algorithm to the spectrogram to produce a noise reduced spectrogram; (4) identifying a signal of interest within the noise reduced spectrogram; (5) calculating an assessment criterion for the noise reduced spectrogram or the signal of interest; and (6) iteratively creating an updated transfer function based on a value of the assessment criteria.

The step of calculating an assessment criterion for the noise reduced spectrogram or the signal of interest further may include one or more of the steps of (1) calculating a covariance distribution of the noise reduced spectrogram; (2) calculating a peak signal to noise ratio of the noise reduced spectrogram; (3) calculating a signal to noise ratio of the noise reduced spectrogram; (4) calculating a noise spectral density of the noise reduced spectrogram; (5) calculating a data reduction ratio of the noise reduced spectrogram; (6) calculating a covariance standard deviation of the noise reduced spectrogram; (7) identifying one or more discontinuities of the noise reduced spectrogram; (8) determining a frequency deviation of the signal of interest; (9) determining a bandwidth deviation of the signal of interest; (10) determining a time-domain correlation of the signal of interest.

The step of identifying one or more discontinuities of the noise reduced spectrogram may include the steps of: (1) calculating a signal to noise ratio or a spectral density of the noise reduced spectrogram to produce a calculated value of the noise reduced spectrogram; (2) calculating a signal to noise ratio or a spectral density of the spectrogram to produce a calculated value of the spectrogram; and (3) comparing the calculated value of the noise reduced spectrogram to the calculated value of the spectrogram.

The step of determining a frequency deviation of the signal of interest may further include the steps of: (1) computing a fast Fourier transform of the signal of interest in the time-domain to produce a plurality of frequency coefficients; (2) computing a mean of the plurality of frequency coefficients; (3) computing a median of the plurality of frequency coefficients; and (4) comparing the mean to the median.

The step of determining a bandwidth deviation of the signal of interest may further include the steps of: (1) computing a spectral density of a main lobe of energy of the signal of interest to produce a lobe density; (2) computing a spectral density in twice a bandwidth of the main lobe of energy of the signal of interest to product a signal density; and (3) comparing the lobe density to the signal density.

The method for training a neural network may include the steps of (1) providing a spectrogram containing noise and at least one signal of interest to the neural network; (2) analyzing the spectrogram to create a transfer function for a noise reduction algorithm; (3) applying the noise reduction algorithm to the spectrogram to produce a noise reduced spectrogram; (4) identifying a signal of interest within the noise reduced spectrogram; (5) calculating an assessment criterion for the noise reduced spectrogram; and (6) iteratively creating an updated transfer function based on a value of the assessment criteria.

The step of calculating an assessment criterion for the noise reduced spectrogram may further include one or more of the steps of (1) calculating a covariance distribution of the noise reduced spectrogram; (2) calculating a peak signal to noise ratio of the noise reduced spectrogram; (3) calculating a signal to noise ratio of the noise reduced spectrogram; (4) calculating a noise spectral density of the noise reduced spectrogram; (5) calculating a data reduction ratio of the noise reduced spectrogram; (6) calculating a covariance standard deviation of the noise reduced spectrogram; and (7) identifying one or more discontinuities of the noise reduced spectrogram.

The step of calculating an assessment criterion for the noise reduced spectrogram may further include the step of: (1) calculating a covariance distribution of the noise reduced spectrogram; (2) calculating a noise spectral density of the noise reduced spectrogram; or (3) calculating a covariance standard deviation of the noise reduced spectrogram.

The method for training a neural network may include the steps of (1) providing a spectrogram containing noise and at least one signal of interest to the neural network; (2) analyzing the spectrogram to create a transfer function for a noise reduction algorithm; (3) applying the noise reduction algorithm to the spectrogram to produce a noise reduced spectrogram; (4) identifying a signal of interest within the noise reduced spectrogram; (5) calculating an assessment criterion for the signal of interest; and (6) iteratively creating an updated transfer function based on a value of the assessment criteria.

The step of calculating an assessment criterion for the signal of interest further may include one or more of the steps of (1) determining a frequency deviation of the signal of interest; (2) determining a bandwidth deviation of the signal of interest; or (3) determining a time-domain correlation of the signal of interest.

BRIEF DESCRIPTION OF THE DRAWINGS

Some embodiments of the present invention are illustrated as an example and are not limited by the figures of the accompanying drawings, in which like references may indicate similar elements.

FIG. 1 is a flowchart of a method for training a neural network according to an embodiment of the present invention.

FIG. 3 is a flowchart of a method for training a neural network according to yet another embodiment of the present invention.

FIG. 4 is a flowchart of a method for calculating assessment criteria for the noise reduced spectrogram or the signal of interest according to an embodiment of the present invention.

FIG. 6 is a flowchart of a method for calculating assessment criteria for the signal of interest according to an embodiment of the present invention.

FIG. 7 is a flowchart of a method for identifying one or more discontinuities in a noise reduced spectrogram according to an embodiment of the present invention.

FIG. 8 is a flowchart of a method for determining a frequency deviation of a signal of interest according to an embodiment of the present invention.

FIG. 9 is a flowchart of a method for determining a bandwidth deviation of a signal of interest according to an embodiment of the present invention.

DETAILED DESCRIPTION OF THE INVENTION

Figure 2:
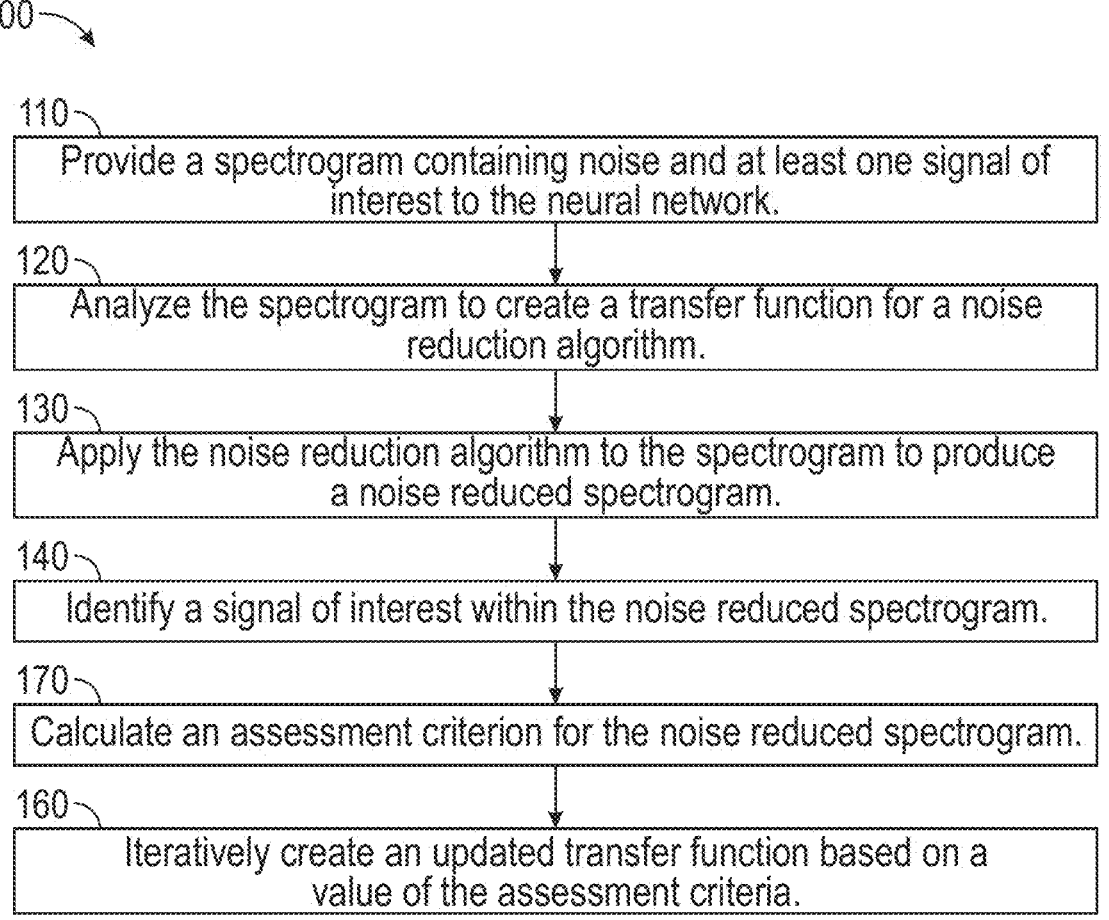
FIG. 2 is a flowchart of a method for training a neural network according to another embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system and method of method for training a neural network 100. The inventive method optimizes the noise reduction and thresholding algorithms to obtain the best signal to noise ratio while also ensuring that signal integrity is adequately maintained for subsequent post-processing.

The optimized noise reduction algorithm may be applied to a data set captured from a sensor system and transformed in such a way that the noise and background in the captured signal are distributed over a transformed space, while information of interest remains concentrated to a bounded region. In the transformed space, the effective signal to noise ratio may be improved by the transformation.

The data set may be captured by a High Probability of Intercept (HPOI) receiver. The HPOI may capture samples over a wide bandwidth, which may be, by way of example, and not as a limitation, up to 5 GHz, to maximize the likelihood that a signal of interest is detected and classified. The data set captured by this receiver will exhibit poor signal to noise ratio (SNR) because the wide bandwidth exposes signals of interest to interference from thermal noise and other signals not of interest.

To improve the SNR, the time-sampled data stream captured by the HPOI is initially transformed into many orthogonal frequency channels, producing a two-dimensional time-frequency array, which may be referred to as a spectrogram. The spectrogram, which resembles a monochrome image, may subsequently be transformed for the purpose of reducing background noise. One or more thresholding algorithms may be applied to the double transformed data set to discern samples that may contain potential signals of interest. Once discerned, potential signals of interest may be extracted from the larger data set. The extracted data may then be further analyzed to identify signals of interest and classify the emitters of the signals of interest.

The second transform of the spectrogram divides the spectrogram into layers based on the frequency content of the differential amplitude of the noise distribution using convolution filters with a transfer function derived from a wavelet basis function. A neural network may be employed to analyze the characteristics of the multilayer spectrogram and optimize the wavelet basis function for the highest signal to noise ratio and lowest degradation of potential signals of interest. The signal to noise ratio may be defined as the difference between the power spectral density of potential signals of interest and the distributed background noise, and the lowest degradation of potential signals of interest.

The neural network training and subsequent noise reduction algorithms may be assessed by evaluating the quality of the derived signals of interest extracted from the data set. The assessment may be evaluated and enforced during the training process to ensure that training converges, does not over or under train the neural network, and does not distort potential signals of interest. The assessment may also be applied to derived signals of interest during operation to inform the confidence of the classified signal and continuously enhance the optimization algorithm.

The method for training a neural network 100 may be used to evaluate noise reduction algorithms used in a process of extraction, identifying, and classifying signals of interest from a data set captured by a HPOI receiver. The data set captured by the HPOI may contain one or more signals of interest. In order to extract, identify, and classify that signal of interest, it must be located amongst noise contained in the data set. In such an embodiment, the data set may be transformed into a spectrogram, which is a two-dimensional data set. There are a number of ways that noise can be minimized in the two-dimensional data set.

A basis function may be used to reduce noise within the spectrogram. In such an embodiment, after the data set is transformed to a spectrogram, a trained neural network may analyze the spectrogram to identify a set of basis functions. The desired set of basis functions yields the highest signal to noise ratio and results in the least amount of signal degradation when used as the transfer function for the noise reduction algorithm. The neural network may be trained with models produced from a combination of live and simulated data.

The basis function assessment algorithm may operate on multiple spectrograms developed from different data sets, gradually building a profile of the noise present on a particular channel. Noise characteristics may be continuously analyzed and the basis functions may be similarly continuously updated during assessment and operation.

A differential amplitude wavelet transform may be utilized to further reduce noise with the spectrogram. In such an embodiment, the differential amplitude wavelet transform may divide the information in the spectrogram by applying low-pass filters to the array, resulting in separating the information as a function of the differential amplitude of the noise distribution. The transfer function for the filter may be a wavelet basis function derived by analysis of the noise distribution and optimization as determined by the basis function optimization.

The optimized basis function may then be applied to the spectrogram and subsequent high frequency data remaining after application of each low pass filter. This creates a set of layers, wherein each layer is a spectrogram containing a portion of the noise distribution, interferers, and signals of interest. Utilizing the differential amplitude wavelet transform results in a distribution of noise over the layers while consolidating samples with discontinuities that likely represent signals of interest.

The noise reduction process and the extraction of signals of interest rely on an accurate threshold to determine the levels for information deprecation. This threshold level may be calculated by creating a histogram of amplitudes for the data set and analyzing the content of the histogram. One or more of the following algorithms may be applied to the histogram to derive the threshold level:

Histogram Minima Threshold—This method may compute the first and second gradients of the histogram to identify the lowest intensity valley or plateau. That low point may be selected as the threshold point below which data is considered noise.

Otsu's Threshold—This method may process the histogram and segment data sets of interest by minimization of the variance on each of the classes. A set of classes may be developed to provide a baseline for the algorithm.

Neural Network Derived Threshold—This method utilizes a neural network designed to identify objects in an image. This neural network is adapted and trained to identify signals of interest contained in the spectrogram, which resembles a grayscale image. This algorithm determines a threshold based on image processing techniques.

The threshold level may be determined by applying one of these algorithms to the histogram for each layer generated by the differential amplitude wavelet transform. Any amplitudes below the threshold level may be deprecated prior to summing the layers together to produce the new spectrogram with lower noise. Note that an aggressive noise reduction process may remove some of the high frequency information, which may represent signals of interest, from the data set.

Object Detection algorithms seek to identify and bound the samples that hold signals of interest. Eliminating data outside the bounds of a signal of interest results in significant data reduction.

The signal level of all or at least a portion of potential signals of interest is anticipated to reside just above the floor defined by the noise remaining after noise reduction techniques have been applied. The signals of interest may be differentiated from signals not of interest because the signals of interest are located within a bounded portion of the spectrogram.

To extract the samples of interest, a new threshold may be computed by applying the amplitude distribution histogram to the noise reduced spectrogram, which contains the bounded signal of interest. The new threshold demarcates the data set of the spectrogram into two regions. The samples in the region below the new threshold are comprised primarily of the remaining noise in the data set. The samples in the region above the new threshold may contain signals of interest.

The result of applying the new threshold to the noise reduced spectrogram is a set of "bounding boxes" that surround and, preferably, wholly enclose the signals of interest. The bounding boxes be adjusted to include samples in the data set exceeding the threshold to ensure that all information relevant to the detected signal is captured within the bounding box. The samples enclosed by a bounding box may be extracted from the larger data and passed to an Identification Process. Limiting the data provided to the Identification Process allows fewer resources to be utilized by the system.

The Identification Process converts the data that has been extracted as a signal of interest into a data set describing the information of the signal of interest in the form of characteristics of the signal of interest. The Identification Process may also differentiate one Signal of Interest from other Signals of Interest and from the background noise. Characteristics of the Signal of Interest that may be identified by the Identification Process include, but are not limited to the following:

Center Frequency—the selected transmission frequency of the signal of interest

Bandwidth—the spectrum occupied by 90% of the power spectral density of the signal of interest.

Modulation Type—parameter translated by the applied data

Burst Length—the time from the beginning to the end of the transmission of the signal of interest Pulse Repetition Frequency—the inverse of the interval of time between signals of interest Extracted samples may be processed using conventional closed form algorithms to compute relevant parameters. By way of example, but not as a limitation, analysis methods for identification may include:

Burst Analysis—This algorithm may evaluate the time-domain samples to identify the burst shape. The identified shape may differentiate the signal as to the source, which may be, by way of example, and not as a limitation, radar, communications, emissions, noise, or the like.

Detection—This algorithm may search time-domain samples to detect one or more preambles or mid-ambles, which may be used by a receiver to calculate the frequency error and determine the beginning of the transmission burst.

Demodulation—This algorithm may attempt to identify the modulation method.

A neural network may be utilized to operate on the spectrogram and identify an extracted signal thorough its two-dimensional image properties. The neural network may leverage image identification technology to determine the likely signal characteristics.

The neural network may identify signals of interest by comparing the output of a convolution process to representations of signals either generated from simulation or captured from other emitters. The neural network identification algorithm may be developed utilizing deep learning training where processing paths, computational structures and scalar coefficients may be instantiated.

A single neural network configuration may process multiple signals of interest. However, a single confidence assessment of the overall signal assessment may be provided rather than an individual confidence assessment for each criterium provided by the Identification Process.

Identified signals may be classified by one or more Classification Algorithms. These Classification Algorithms may attempt to discern the specific type of signal by comparing the output of the Identification Process to signals in a database. Signals may be classified based on similarity to one or more entries and assessed a confidence level based on the differences between the identified characteristics and the characteristics of reference signals in a database.

The extracted signal will suffer some level of distortion caused by at least channel characteristics, the effects pf propagation through the environment, losses from noise, and interference and artifacts from the noise reduction process. All of these distorting factors produce imperfect metrics, which must be evaluated to produce a likely classification and corresponding confidence factor.

To address the imperfect nature of the system, extracted signals may be measured against a set of assessment criteria to determine the performance of the processes used to get to the classification step and inform the classification algorithm as to what the confidence factor should be.

Quality metrics related to each criterion may be maintained and associated with the classified signals. These quality metrics may be derived from the processed data and guide the evaluation of the identified signals. Quality metrics may also be used to update training of neural networks and drive modifications and enhancements of the algorithms utilized in the system to improve future performance.

The method for training a neural network 100 may apply assessment criteria to either of the noise reduced spectrogram or the extracted signal of interest to evaluate the performance of the noise reduction algorithm and iteratively adjust parameters of the noise reduction algorithm as necessary. The assessment criteria applied to the noise reduced spectrogram may be referred to as data set assessment criteria. The assessment criteria applied to the extracted signal of interest may be referred to as signal quality assessment criteria.

There are a number of data set assessment criteria that may be evaluated to determine the adequacy of noise reduction employed to produce the noise reduced spectrogram. These data set assessment criteria include, but are not limited to, covariance distribution, peak signal to noise ratio, signal to noise ratio, noise spectral density, data reduction ration, covariance standard deviation, and discontinuities. Any of these may be applied to the results of one or more system processes that reduce the data set.

A covariance function resolves to a unit impulse at the center of a data set comprised entirely of random noise. This is because, when the data set is comprised entirely of random noise, the correlation result will only peak at the center of data set where it perfectly aligns with itself. If a covariance function provides other peaks from the data set, this is an indicator that the data set contains samples that are not random noise.

This characteristic of a covariance function makes it well suited to be utilized for making for multiple data set assessments. The covariance function may be utilized to assess a set of samples to determine (1) the nature of the noise contained in the samples, (2) whether or not there are potential signals of interest contained in the sample, and (3) the performance of a noise processing algorithm.

A covariance function may be applied to a data set composed primarily of random noise to determine the noise spectral density function of the data sate. A data set that has a higher value than the value of the random noise may contain a signal of interest within the noise. As more noise is removed from the data set, the covariance value will be smaller.

The covariance function may be expressed as $$A(x, y) = \frac{1}{\mathrm{Var}\,(f)} \sum_{l=0}^{L-1} \sum_{m=0}^{M-1} f(l, m) f(l - x,\ m - y)$$

where:

f[l,m] represents the source array, and

A[x,y] represents the result array.

The peak signal to noise ration (PSNR) is the ratio of the maximum possible signal power to the power of the distorting noise. The goal of a noise reduction process applied to any data set is to maximize the PSNR.

PSNR may be expressed as $$PSNR = 20 \log_{10}\left(\frac{S_{Peak}}{\sqrt{N_{mse}}}\right)$$

where:

$S_{peak}$ is the maximum signal power, $N_{mse}$ is the average noise power, and Mean Squared Error of a two-dimensional array is defined as:

$$X_{mse} = \frac{1}{MN} \sum_{m=0}^{M-1} \sum_{n=0}^{N-1} \|f(m, n) - g(m, n)\|^2$$

where:

f represents the matrix of the original array g represents the matrix of the degraded array M represents the numbers of rows of the array and m represents the index of that row N represents the number of columns of the array and n represents the index of that column The signal to noise ration (SNR) is the measure of average signal power to average noise power. The goal of any noise reduction process applied to a data set is to maximize the SNR.

SNR may be expressed as $$SNR = 20 \log_{10}\left(\frac{\sqrt{S_{mse}}}{\sqrt{N_{mse}}}\right)$$

where:

$S_{mse}$ is the average signal power, $N_{mse}$ is the average noise power, and Mean Squared Error of a two-dimensional array is defined as:

$$X_{mse} = \frac{1}{MN} \sum_{m=0}^{M-1} \sum_{n=0}^{N-1} \|f(m, n) - g(m, n)\|^2$$

where:

f represents the matrix of the original array g represents the matrix of the degraded array M represents the numbers of rows of the array and m represents the index of that row N represents the number of columns of the array and n represents the index of that column Noise spectral density is the noise power of a data set as a function of frequency within a given channel. Noise spectral density represents a combination of thermal noise, quantization noise due to the sampling, clock jitter and semiconductor noise. The value of noise spectral density may be utilized to analyze the effect of signal processing on the distribution of noise over frequency.

To calculate noise spectral density, a portion of the data set that contains primarily noise must be identified. A two-dimensional discrete transform of this identified noise data may be computed to determine the noise distribution. Using the distribution, which is the result of the two-dimensional discrete transform, the total noise power may be computed by applying the distribution over the total array.

Noise Spectral Density as a function of frequency may be expressed as $$N(x, y) = \frac{1}{\sqrt{LM}} \sum_{l=0}^{L-1} \sum_{m=0}^{M-1} n[l, m] e^{-j 2\pi \left(\frac{lx}{L} + \frac{my}{M}\right)}$$

where:

n[l,m] represents the matrix of the source array, and

N(x,y) represents the matrix of the noise spectral density.

The ratio of the number of samples before a data reduction to the number of samples after the reduction process may be referred to as the data reduction ratio.

In embodiments in which the reduction process inserts zeros in a sample that is deemed to be insignificant, the data reduction ratio may be expressed as $$R = \frac{\left(\sum_{l=0}^{L-1} \sum_{m=0}^{M-1} Y(l, m)\right)}{\left(\sum_{l=0}^{L-1} \sum_{m=0}^{M-1} X(l, m)\right)}$$

where:

X[l,m] represents the matrix of the source array, and

Y[l,m] represents the matrix of the destination array.

For a given covariance output, the standard deviation of that covariance output is a measure of the randomness of the particular covariance measurement. For a completely random data set, the standard deviation of the covariance will be close to the average of the measured covariances. The standard deviation of the covariance will increase with a higher distribution of noise power contained in the data set. After a noise reduction algorithm has been applied to a data set, the covariance standard deviation will decrease when compared to the data set prior to the application of noise reduction. The standard deviation of covariance may be expressed as $$STD = \sqrt{\frac{1}{LM} \sum_{l=0}^{L-1} \sum_{m=0}^{M-1} \left(A(l, m) - \overline{A}\right)^2}$$

where:

A[l,m] represents the covariance array.

Discontinuities present in data sets in the time domain add a uniform layer of noise to those data sets. However, signals of interest contained in those data sets will generally not exhibit discontinuities. In some instances, discontinuities may be created in signals of interest during the signal extraction process when portions of relevant information are truncated. Evidence of such a discontinuity may be discerned by calculating the signal to noise ratio or noise spectral density of an extracted data set after data reduction algorithms have been applied and comparing those values to the source information.

Just as there are a number of data set assessment criteria that may be evaluated to determine the adequacy of noise reduction, there are a number of signal quality assessment criteria that may be evaluated to determine the adequacy of the extracted signal of interest. Signal quality assessment criteria may define the characteristics of the signal of interest that must be preserved to enable the identification and classification algorithms to return high confidence levels for classified signals. If extraction processes cause significant damage or degradation to the remaining signal of interest, the signal of interest may be assessed as unknown, not classified, or potentially classified as the wrong signal.

To facilitate signal quality assessments, the extracted data set, which is expected to contain a signal of interest, may be converted to a time-domain series. This time-domain series version of the signal of interest represents the original transmitted information, which was captured by the HPOI. If the captured data set was spread over multiple channels during initial processing, a frequency to time process may be utilized to combine the information from the multiple channels back to a single data set. Subsequent analysis of the signal of interest may be performed on this recombined time-domain representation. Signal quality assessment criteria that may be used to evaluate the time-domain extracted signal of interest include, but are not limited to, frequency deviation, bandwidth deviation, and time-domain correlation.

The center carrier frequency of very few captured signals will be exposed. However, generally the center carrier frequency is not required to demodulate the source of the signal, it would require additional transmit power to send the signal with its center carrier frequency, and no significant benefits to the performance of the receiver are offered by determining the center carrier frequency of the capture signal. But it is known that most transmitted signals are symmetric across the primary spectrum when symmetry is defined as 90% of the transmitted energy of the signal. Therefore, a properly detected signal will exhibit both a median and mean at the center of the transmitted spectrum when computed over a time period that reasonably encompasses enough data to represent a uniform distribution.

A signal may be analyzed to determine if there is a frequency deviation. Analysis to determine if the median and mean of the signal of interest appear as expected may by performed by computing the fast Fourier transform (FFT) of the time-domain data set. The mean and median may be computed on the frequency coefficients produced by the FFT. A deviation between the mean and the median indicates that the detection process has left out relevant portions of the spectrum.

Bandwidth deviation of signal of interest may be assessed in the frequency domain after extraction. This assessment may utilize the output of the FFT computed during frequency deviation analysis to evaluate the power spectral density of the signal and compare that to the expected bandwidth deviation.

The spectral density of the main lobe of signal energy, which may be defined as 90% of the total energy of the signal of interest, may be computed and compared to the density in twice the bandwidth of the main lobe. The spectral density may then be assessed by looking at the following properties:

Symmetry—a modulated signal should be symmetric about the center frequency

Energy Distribution—a modulated signal has a known energy distribution across the spectrum, unique to the type of signal Shape—the shape of the power spectral density function is unique to the modulation type of the signal Time-domain correlation may be evaluated on the signal of interest to discern the structure of the signal. Signal transmission methods strive to randomize the information that is transmitted. An interleaver process may be applied to a data set to distribute bits uniformly over the spectrum for the purpose of minimizing sequential bit errors that are more likely to be affected by fading. However, for a communication signal to be properly detected, there must be portions of the transmission that yield a high level of time-domain correlation. To optimize the identification and classification processes, noise reduction and extraction algorithms must not degrade or eliminate these portions of the transmission that have the high level of time-domain correlation.

Similar to a covariance distribution analysis, which may be performed on the original data set to discern likely locations of signals of interest, a time-domain correlation analysis may be performed on the time-domain extracted data containing the signal of interest for the purpose of discerning the structure of the signal of interest.

A Fully Convolutional Neural Network (FCNN) may be uniquely suited to the task of assessing imperfect information to derive useful results. The FCNN may be designed and trained to evaluate many combinations of the identifying characteristics and directly produce the estimated classification and the confidence of that estimate.

However, the network must be trained to perform this task using a set of images that contain the expected information and an estimate of the expected noise and channel characteristic. The training for the FCNN is a significant effort and must be approached with care to avoid under training, over training, and false representations of the information space. Conventional assessment of training performance operates by detecting convergence driven by the errors in classification.

Even with significant training, the resulting FCNN is only as good as the original reference data and the process that determined convergence to a working algorithm. As real data is processed and real signals are evaluated, any shortcomings of the FCNN and the training that produced it must be assessed for continuous improvement.

A properly operating noise reduction process depresses the noise sufficiently to expose all of the potential signals of interest and include just enough samples to discern a potential signal of interest. After extracting a signal of interest, the properties of the sample set that contains the potential signal of interest may be readily determined. Discontinuities, structure, and covariance standard deviation may be evaluated to determine the performance of the extraction process.

Discontinuities arise when the detection process has failed to include all the information that defines the signal of interest. If present, discontinuities will cause an increase in bandwidth without an increase in information. An optimized system may seek to minimize discontinuities Extracted signals should have a structure with a well-defined beginning and end.

Covariance Standard deviation is measured to assess the randomness of the extracted data. While some communications systems deliberately randomize the transmission data to prevent detection, a signal of interest may have characteristics that may be differentiated from noise or random content.

Ideally, identified signals of interest would perfectly match an entry in a classification database. However, channel effects, adjacent interferers and residual noise may cause distortion in the derived metrics that reduce accuracy of identification and a less than perfect match to an entry in the classification database. This may result in a less than optimum classification for a signal of interest.

Analysis of signal quality assessment criteria may determine if any of the processes applied to the captured data set resulted in a poor classification database match or confidence level. In particular, a poor classification database match or low confidence level may be the result of a loss of information through the noise reduction process, a poor detection process, or multiple likely matches.

An effective noise reduction process relies on an accurate estimate of the original transfer function of the signal of interest. This estimate of the original transfer function may be adversely affected by the characteristics of the noise that are part of the information represented by the samples. A typical result of an incorrect noise reduction process is the loss of high-frequency information.

The goal of the identification process is the bounding of samples that represent a signal of interest. To ensure that information is not lost, the "bounding box" algorithm may be calibrated to include additional samples beyond those needed. However, it is possible that the characteristics of the signal make it difficult to identify the appropriate boundaries of the samples. Spread spectrum algorithms may be particularly difficult to properly bound.

Sometimes, the identified data may match multiple classification entries in the database. In these instances, the confidence level of the match may be driven not by the poor quality of the data but by the inability to discern the correct match due to the availability of multiple adequate matches.

Environmental effects may result in distortion to the signal such that the identification and classification algorithm do not yield an acceptable result.

Some possible environmental effects that would result in a poor confidence include a poor signal to noise ratio, fading and multipath, and interference.

A signal significantly affected by the channel characteristic due to propagation loss will exhibit a poor signal to noise ratio. The algorithms used to remove thermal noise from the system during the noise reduction process will not likely improve the poor signal to noise ratio as the information needed to properly classify the signal may have been destroyed in the process of reducing the noise.

Fading and multipath may produce amplitude variations in the time domain that are inconsistent with the expected waveform. The standard deviation of the average signal power for a signal suffering from fading and multipath may show significant energy past the one sigma mark.

If multiple signals occupy the same time-space channel, the signals may interfere with one another and enough information may be destroyed to prevent meaningful identification of any of the interfering signals.

Outside of environmental effects that damage the signal rendering a poor identification and classification, the system may have uncovered a signal that does not have a counterpart in the database. If some or all of the identification criteria yield high confidence but there was a poor match, this signal would be classified as "unknown". Subsequent post-analysis evaluation may result in an update to the classification database.

Turning to at least FIG. 1, the method for training a neural network 100 may include the steps of (1) providing a spectrogram containing noise and at least one signal of interest to the neural network (110); (2) analyzing the spectrogram to create a transfer function for a noise reduction algorithm (120); (3) applying the noise reduction algorithm to the spectrogram to produce a noise reduced spectrogram (130); (4) identifying a signal of interest within the noise reduced spectrogram (140); (5) calculating an assessment criterion for the noise reduced spectrogram or the signal of interest (150); and (6) iteratively creating an updated transfer function based on a value of the assessment criteria (160).

Another embodiment of the method for training a neural network 100, as depicted at least in FIG. 2, may include steps of (1) providing a spectrogram containing noise and at least one signal of interest to the neural network (110); (2) analyzing the spectrogram to create a transfer function for a noise reduction algorithm (120); (3) applying the noise reduction algorithm to the spectrogram to produce a noise reduced spectrogram (130); (4) identifying a signal of interest within the noise reduced spectrogram (140); (5) calculating an assessment criterion for the noise reduced spectrogram (170); and (6) iteratively creating an updated transfer function based on a value of the assessment criteria (180).

Another embodiment of the method for training a neural network 100, as depicted at least in FIG. 3, may include steps of (1) providing a spectrogram containing noise and at least one signal of interest to the neural network (110); (2) analyzing the spectrogram to create a transfer function for a noise reduction algorithm (120); (3) applying the noise reduction algorithm to the spectrogram to produce a noise reduced spectrogram (130); (4) identifying a signal of interest within the noise reduced spectrogram (140); (5) calculating an assessment criterion for the signal of interest (180); and (6) iteratively creating an updated transfer function based on a value of the assessment criteria (160).

Turning to FIG. 4, a method for calculating assessment criteria for the noise reduced spectrogram or the signal of interest 400 may include one or more of the steps of (1) calculating a covariance distribution of the noise reduced spectrogram (410); (2) calculating a peak signal to noise ratio of the noise reduced spectrogram (420); (3) calculating a signal to noise ratio of the noise reduced spectrogram (430); (4) calculating a noise spectral density of the noise reduced spectrogram (440); (5) calculating a data reduction ratio of the noise reduced spectrogram (450); (6) calculating a covariance standard deviation of the noise reduced spectrogram (460); (7) identifying one or more discontinuities of the noise reduced spectrogram (470); (8) determining a frequency deviation of the signal of interest (480); (9) determining a bandwidth deviation of the signal of interest (490); and (10) determining a time-domain correlation of the signal of interest (495).

Figure 5:
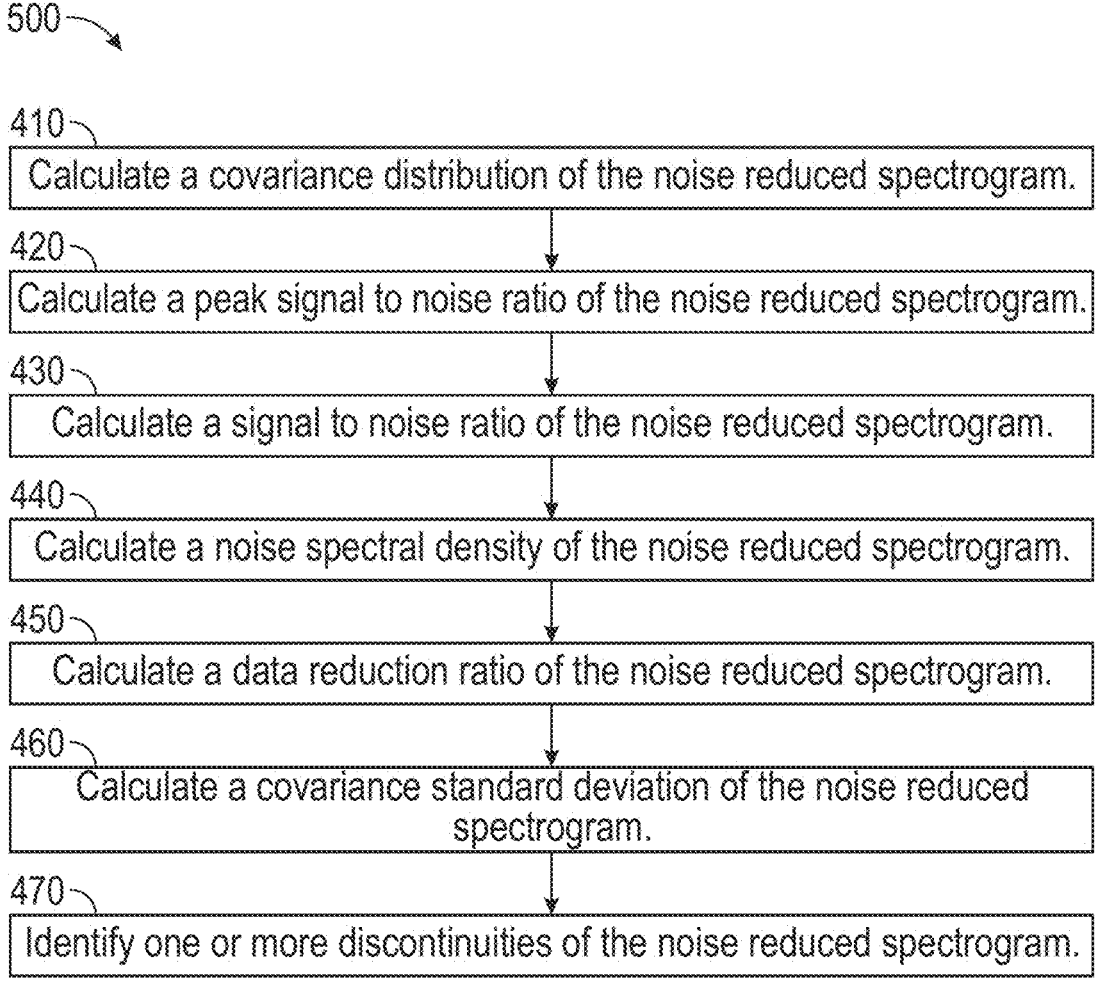
FIG. 5 is a flowchart of a method for calculating assessment criteria for the noise reduced spectrogram according to an embodiment of the present invention.

Turning to FIG. 5, the method of calculating an assessment criterion for the noise reduced spectrogram 500 may further include one or more of the steps of (1) calculating a covariance distribution of the noise reduced spectrogram (410); (2) calculating a peak signal to noise ratio of the noise reduced spectrogram (420); (3) calculating a signal to noise ratio of the noise reduced spectrogram (430); (4) calculating a noise spectral density of the noise reduced spectrogram (440); (5) calculating a data reduction ratio of the noise reduced spectrogram (450); (6) calculating a covariance standard deviation of the noise reduced spectrogram (460); and (7) identifying one or more discontinuities of the noise reduced spectrogram (470).

Turning to FIG. 6, the method of calculating an assessment criterion for the signal of interest 600 further may include one or more of the steps of (1) determining a frequency deviation of the signal of interest (480); (2) determining a bandwidth deviation of the signal of interest (490); and (3) determining a time-domain correlation of the signal of interest (495).

Turning to FIG. 7, the method of identifying one or more discontinuities of the noise reduced spectrogram 700 may include the steps of: (1) calculating a signal to noise ratio or a spectral density of the noise reduced spectrogram to produce a calculated value of the noise reduced spectrogram (710); (2) calculating a signal to noise ratio or a spectral density of the spectrogram to produce a calculated value of the spectrogram (720); and (3) comparing the calculated value of the noise reduced spectrogram to the calculated value of the spectrogram (730).

Turning to FIG. 8, the method of determining a frequency deviation of the signal of interest 800 may further include the steps of: (1) computing a fast Fourier transform of the signal of interest in the time-domain to produce a plurality of frequency coefficients (810); (2) computing a mean of the plurality of frequency coefficients (820); (3) computing a median of the plurality of frequency coefficients (830); and (4) comparing the mean to the median (840).

Turning to FIG. 9, the method of determining a bandwidth deviation of the signal of interest 900 may further include the steps of: (1) computing a spectral density of a main lobe of energy of the signal of interest to produce a lobe density (910); (2) computing a spectral density in twice a bandwidth of the main lobe of energy of the signal of interest to product a signal density (920); and (3) comparing the lobe density to the signal density (930).

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for assessing a noise reduction algorithm and subsequent training of a neural network comprising the steps of:
   providing a spectrogram containing noise and at least one signal of interest to the neural network;
   analyzing the spectrogram to create a transfer function for a noise reduction algorithm;
   applying the noise reduction algorithm to the spectrogram to produce a noise reduced spectrogram;
   identifying a signal of interest within the noise reduced spectrogram;
   calculating an assessment criterion for the noise reduced spectrogram or the signal of interest; and
   iteratively creating an updated transfer function based on a value of the assessment criteria.

2. The method of claim 1 wherein the step of calculating an assessment criterion for the noise reduced spectrogram further includes the step of:
   calculating a covariance distribution of the noise reduced spectrogram.

3. The method of claim 1 wherein the step of calculating an assessment criterion for the noise reduced spectrogram further includes the step of:
   calculating a peak signal to noise ratio of the noise reduced spectrogram.

4. The method of claim 1 wherein the step of calculating an assessment criterion for the noise reduced spectrogram further includes the step of:
   calculating a signal to noise ratio of the noise reduced spectrogram.

5. The method of claim 1 wherein the step of calculating an assessment criterion for the noise reduced spectrogram further includes the step of:
   calculating a noise spectral density of the noise reduced spectrogram.

6. The method of claim 1 wherein the step of calculating an assessment criterion for the noise reduced spectrogram further includes the step of:
   calculating a data reduction ratio of the noise reduced spectrogram.

7. The method of claim 1 wherein the step of calculating an assessment criterion for the noise reduced spectrogram further includes the step of:
   calculating a covariance standard deviation of the noise reduced spectrogram.

8. The method of claim 1 wherein the step of calculating an assessment criterion for the noise reduced spectrogram further includes the step of:
   identifying one or more discontinuities of the noise reduced spectrogram.

9. The method of claim 8 wherein the step of identifying one or more discontinuities of the noise reduced spectrogram further includes the steps of:

calculating a signal to noise ratio or a spectral density of the noise reduced spectrogram to produce a calculated value of the noise reduced spectrogram;

calculating a signal to noise ratio or a spectral density of the spectrogram to produce a calculated value of the spectrogram; and comparing the calculated value of the noise reduced spectrogram to the calculated value of the spectrogram.

10. The method of claim 1 wherein the step of calculating an assessment criterion for the signal of interest further includes the step of:

determining a frequency deviation of the signal of interest.

11. The method of claim 10 wherein the step of determining a frequency deviation of the signal of interest further comprises the steps of:

computing a fast Fourier transform of the signal of interest in the time-domain to produce a plurality of frequency coefficients;

computing a mean of the plurality of frequency coefficients;

computing a median of the plurality of frequency coefficients; and comparing the mean to the median.

12. The method of claim 1 wherein the step of calculating an assessment criterion for the signal of interest further includes the step of:

determining a bandwidth deviation of the signal of interest.

13. The method of claim 12 wherein the step of determining a bandwidth deviation of the signal of interest further comprises the steps of:

computing a spectral density of a main lobe of energy of the signal of interest to produce a lobe density;

computing a spectral density in twice a bandwidth of the main lobe of energy of the signal of interest to product a signal density; and comparing the lobe density to the signal density.

14. The method of claim 1 wherein the step of calculating an assessment criterion for the noise reduced spectrogram or the signal of interest further includes the step of:

determining a time-domain correlation of the signal of interest.

15. A method for assessing a noise reduction algorithm and subsequent training of a neural network comprising the steps of:

providing a spectrogram containing noise and at least one signal of interest to the neural network;

analyzing the spectrogram to create a transfer function for a noise reduction algorithm;

applying the noise reduction algorithm to the spectrogram to produce a noise reduced spectrogram;

identifying a signal of interest within the noise reduced spectrogram;

calculating an assessment criterion for the noise reduced spectrogram; and iteratively creating an updated transfer function based on a value of the assessment criteria.

16. The method of claim 15 wherein the step of calculating an assessment criterion for the noise reduced spectrogram further includes the step of:

calculating a covariance distribution of the noise reduced spectrogram.

17. The method of claim 15 wherein the step of calculating an assessment criterion for the noise reduced spectrogram further includes the step of:

calculating a noise spectral density of the noise reduced spectrogram.

18. The method of claim 15 wherein the step of calculating an assessment criterion for the noise reduced spectrogram further includes the step of:

calculating a covariance standard deviation of the noise reduced spectrogram.

19. A method for assessing a noise reduction algorithm and subsequent training of a neural network comprising the steps of:

providing a spectrogram containing noise and at least one signal of interest to the neural network;

analyzing the spectrogram to create a transfer function for a noise reduction algorithm;

applying the noise reduction algorithm to the spectrogram to produce a noise reduced spectrogram;

identifying a signal of interest within the noise reduced spectrogram;

calculating an assessment criterion for the signal of interest; and iteratively creating an updated transfer function based on a value of the assessment criteria.

20. The method of claim 19 wherein the step of calculating an assessment criterion for the signal of interest further includes the step of:

determining a frequency deviation of the signal of interest.

* * * * *